United States Patent [19]

Iverson

[11] 4,358,001
[45] Nov. 9, 1982

[54] WET DISC FRICTION BRAKE CIRCULATION SYSTEM

[76] Inventor: Roger A. Iverson, 609 Mullins Dr., Arlington, Tex. 76014

[21] Appl. No.: 579,420

[22] Filed: May 21, 1975

[51] Int. Cl.³ .............................................. F16D 65/84
[52] U.S. Cl. ................................. 188/71.6; 188/71.5; 188/264 E; 192/70.12; 192/113 B
[58] Field of Search ............. 188/264 E, 251 M, 71.5, 188/71.6; 192/70.12, 113 B

[56] References Cited

U.S. PATENT DOCUMENTS 2,518,016  8/1950  Johnson et al. .................. 188/264 E
2,519,865  8/1950  Wellman ..................... 188/251 M X

FOREIGN PATENT DOCUMENTS 651876   4/1951  United Kingdom ............ 188/264 E
701725  12/1953  United Kingdom ............ 188/264 E
816169   7/1959  United Kingdom ........... 188/251 M Primary Examiner—George E. A. Halvosa
Attorney, Agent, or Firm—Richards, Harris & Medlock

[57] ABSTRACT

A rotor disc assembly of a wet disc brake is driven from a shaft with discs thereof movable axially along the shaft. Stator discs are splined to a stationary housing and are interleaved with members of the rotor assembly. Stator disc structure between each adjacent pair of rotor discs each has low impedance flow channels radially extending from the outer to inner peripheries of the stator discs for return flow of oil pumped from the region of the shaft to the periphery.

5 Claims, 11 Drawing Figures

WET DISC FRICTION BRAKE CIRCULATION SYSTEM

This invention relates to wet disc friction brakes, and more particularly, to structure which permits and assures multiple local circulation of oil through a multiplicity of static braking discs and rotor discs, respectively, anchored to a stationary brake housing and a rotating shaft.

Wet disc friction brakes are known in the prior art. British Pat. No. 651,876 and U.S. Pat. No. 3,410,375 illustrate and describe such systems. A coolant liquid is supplied either continuously to the brake or supplied through a valve under the control of a brake pedal. When the coolant flows continuously and the brake is engaged, attempts have been made to maintain liquid between the working brake surfaces. Brake rotor discs have been developed wherein grooves of various patterns are provided to channel the flow of oil from the region of the shaft on which rotor discs are mounted to the periphery thereof to carry away the heat generated. In British Pat. No. 651,876, the flow of such liquid which emerges from the periphery of the brake structure is channeled from the rotating housing through flow channels back to the region of the shaft surface so that a supply of oil may be provided for outward flow over the brake discs.

Prior systems have not been found to be satisfactory where the number of discs in a stack becomes high. Dry, hot spots are developed which lead to early failure.

In accordance with the present invention, a combination of elements is provided which substantially improves the operation of wet disc friction brakes. The improvement is achieved by the combination of grooved rotor discs which provide for the pumping outwardly of coolant liquid from the region of the shaft, on which the rotor discs are mounted, to the stationary housing on which the stator discs are mounted. Stator disc structures are provided between each adjacent pair of rotor discs. The stator disc structures each have low impedance flow channels radially extending from the outer to the inner peripheries of the stator discs for the return flow of pressurized coolant liquid.

In a further aspect, the amount of coolant fluid is carefully controlled and the surfaces on the housing for the brake system are channeled for high efficiency in heat transfer and for controlling the character of the cooling fluid contacting the housing.

More particularly in accordance with the present invention, there is provided a wet disc friction brake wherein a rotor disc assembly is mounted on a center shaft and splined thereto for axial motion. A stationary housing is provided with stator discs splined thereto. At least one stator disc is positioned intermediate each adjacent pair of rotor discs. Each rotor disc is provided with pumping grooves in the working surface thereof for pumping coolant fluid outward from the shaft to impinge on the housing and to produce pressurized liquid in the housing region outside of the rotors. Stator members provided between each adjacent pair of rotor discs have low impedance flow channels for flow of the pressurized coolant liquid from the outer housing portion towards the shaft.

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

One form of the invention comprises a liquid-cooled disc brake assembly in which an assembly of rotor discs and an assembly of stator discs are interleaved. The rotor discs are slidably driven as by a spline on a wheel. The stator discs are splined to a housing for axial movement along and spaced from the shaft. The rotor and stator discs are sealed within a stationary housing. A body of cooling liquid is maintained within the housing. The cooling liquid does not completely fill the housing cavity, but rather occupies only a portion of the sealed interior space, preferably rising, when the rotors are at rest, to a height of about one-third of the distance between the inner and outer radius of the rotor discs.

In accordance with the invention, the stator discs have passages which extend radially from outer to inner periphery. Surface grooves are provided on the working faces of the rotor discs, such that the cooling liquid will be pumped outward during braking action. The high velocity liquid at the perimeter of the discs is then thrown outward to impact the inner ribbed wall of the housing. The passages in the stator discs permit high pressure in the liquid at the periphery to force the liquid radially inward to the center of the stator discs. Liquid between the working faces of each stator and relatively moving rotor then is pushed outward. Continuous circulation of the cooling liquid is thus induced.

Cooling liquid thrown off the periphery of a rotating disc impacts directly upon the interior wall of the stationary housing. The irregular surface of the wall induces the fluid stream to break up upon impact, thereby increasing heat transfer efficiency. To enhance heat transfer between the liquid and the housing, and to increase the mixing action, a plurality of projections (or grooves) preferably are provided on the interior wall as well as the exterior wall of the stationary housing.

In contrast, previously known brake cooling systems rely upon bulk fluid and heat transfer techniques utilizing pumps and radiators in complex hardware design. And in those brake systems with fluid wholly contained with the brake, as in British Pat. No. 651,876, heat transfer is not sufficient to withstand the energy levels of the brake subject to this disclosure. These systems rely upon rudimentary mixing systems to agitatie, foam, and induce turbulence in the fluid devoid of the pumping and impact characteristics associated with the said brake.

Means are provided for forcing the rotor and stator disc assemblies together. Typically, hydraulic means is employed with an additional means being either mechanical or electrical for an emergency braking control.

Figure 1:
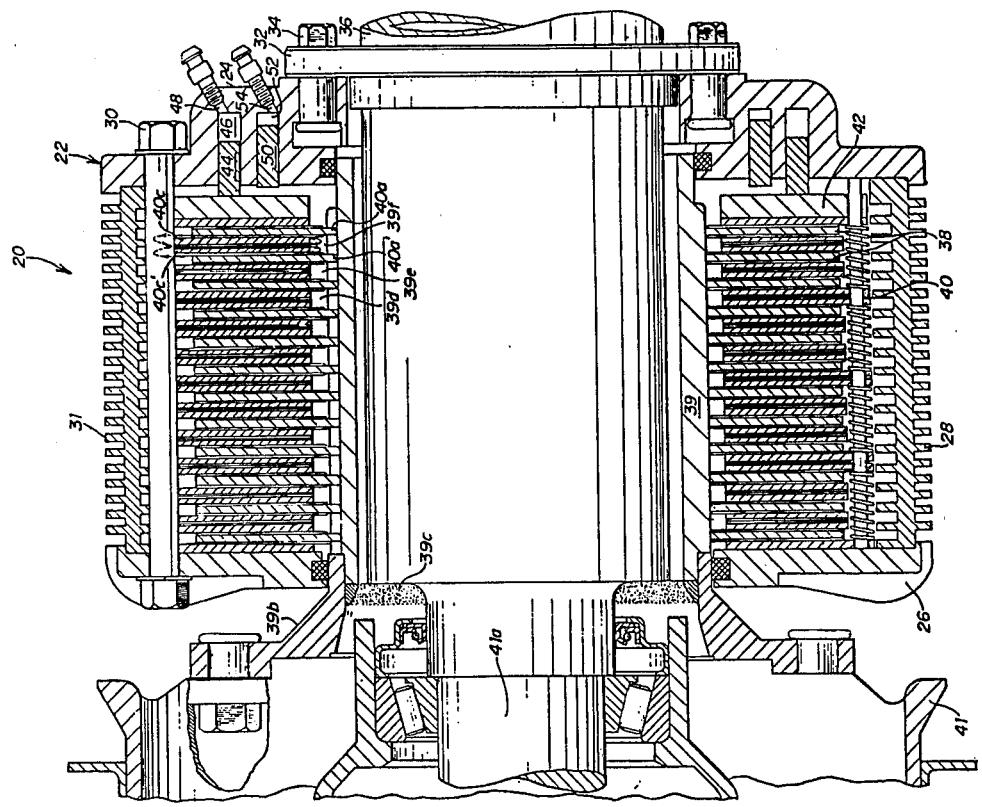
FIG. 1 is a view partially in section of an embodiment of the present invention.

Referring now to FIG. 1, a generally cylindrical housing 22 is provided which is adapted to be sealed for the retention of a cooling liquid. The hollow housing is formed by inside wall 24, outside wall 26, and an annular ring 28. The housing is adapted to surround a rotative member which is to be selectively braked, such as the axle on which wheels of a truck or trailer are mounted. The walls 24, 26 and 28 are held together by bolts 30, such that they form a liquid-tight unit when appropriate seals are provided. As is common in vehicle applications, a mounted plate 32 is rigidly mounted on an axle housing 36, typically by welding or the like. Bolts 34 are employed to hold the cylindrical housing 22 rigidly against the axle housing 36.

Mounted for rotation inside the cylindrical housing 22 are a plurality of rotor discs 38. The discs 38 are adapted to translate or "float" axially within the housing, and also to rotate by drive forces transmitted through a rotating sleeve 39. Spline structures interlock the rotor discs 38 and the sleeve 39. Sleeve 39 constitutes a portion of structure for connecting the rotor discs 38 to an external rotating body which is to be braked, e.g., the wheel 41. Sleeve 39 is secured to wheel 41 by a collar 39b and weldment 39c so that sleeve 39 is coaxial with axle 41a.

Interleaved with the rotor discs 38 are stator discs 40. Stator discs 4 are splined at the outer perimeter such that they are anchored to and may move axially within the housing. They are held against rotation by means such as bolts 30.

A pressure ring 42 is provided to transmit forces to compress the rotor discs 38 and the stator discs 40. The stator discs frictionally oppose rotation of the rotor discs 38 by contact of the working faces.

In the embodiment of FIG. 1, two actuators are provided for axially forcing the discs together. The first comprises an actuating ring 44 which is adapted to slide within groove 46 in wall 24. When the groove 46 is pressurized by admitting a pressurized fluid through passage 48, the actuating ring 44 is caused to move axially (to the left in FIG. 1) and bear against the pressure ring 42. Appropriate seals (not shown) are provided to keep the pressurized fluid in chamber 46 from migrating around ring 44 and mixing with a cooling liquid which wets the discs 38, 40. The second control comprises actuating ring 50 which sealingly slides in groove 52 when pressurized fluid is admitted to the groove through passage 54. Either actuating ring 44 or actuating ring 50 can be employed to press against pressure ring 42. The two actuating rings can operate completely independent of one another for operations above described.

In operations of grooved rotor discs, it is well known in the art that a pumping action is produced which forces oil outward along the working face of discs 38 from the surface of sleeve 39 to the outer periphery of the rotor discs 38. A conventional rotor disc is of the type shown in FIG. 2. The disc 38a has a working face in which grooves, such as grooves 38b, are provided. The groove 38b extends to the inner edge of the working surface as at point 38c so that coolant may enter the grooves 38b as the rotor disc 38a rotates and moves outwardly along the grooves serving to wet the working face of the confronting stator disc. A plurality of grooves are provided with the grooves in this embodiment occupying a greater area of the working face near the inner periphery than near the outer periphery, thus providing a controlled heat transfer characteristic to the working face of the rotor disc. Other groove patterns are sometimes employed but for the same purpose.

The rotor disc 38a is provided with splines 38d which cooperate with splines 39a on sleeve 39. Thus, the rotor discs may be translated axially along the surface of the sleeve 39 but must rotate with the sleeve 39.

Figure 2:
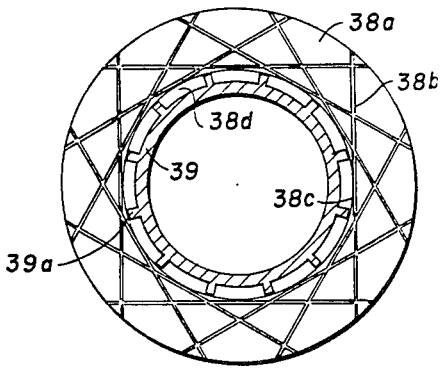
FIG. 2 is a front view of a typical rotor plate embodied in the system of FIG. 1.
Figure 6:
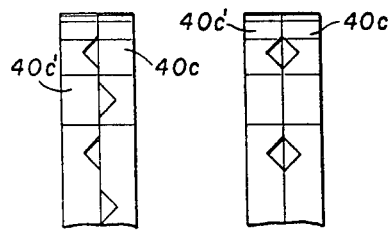
FIG. 6 is an enlarged view of a portion of the edge of the two plates of FIG. 5.

Wet disc friction brakes having structure such as illustrated in FIG. 2 and mounted on a sleeve 39 such as shown in FIG. 1 are conventional and have heretofore been widely used.

The problem to which the present invention is addressed is to provide and assure the local circulation of the coolant fluid, the local circulation being completed from the outer periphery back to the inner periphery of the working surfaces at and between every pair of rotor discs. The invention is particularly important in braking structures where a stack of rotor discs is of substantial number. It exhibits greatest advantage if the stack of rotor discs is six or more of both rotor and stator discs. In such case it has great significance because it avoids the occurrence of dry areas in large disc stacks which cause the discs to warp resulting in brake failure.

The present invention, therefore, is directed to the provision of a stack of rotor discs of the general character illustrated in FIG. 2 combined interleaved with stacked stator discs of the type shown in FIGS. 3–9.

Figure 3:
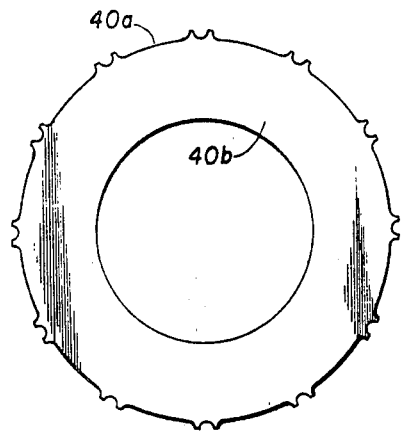
FIG. 3 is a front view of one face of a stator plate employed in the present invention.
Figure 5:
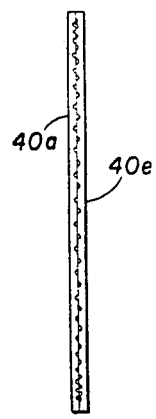
FIG. 5 is an edge view of two stator plates having the channel faces confronting each other.
Figure 4:
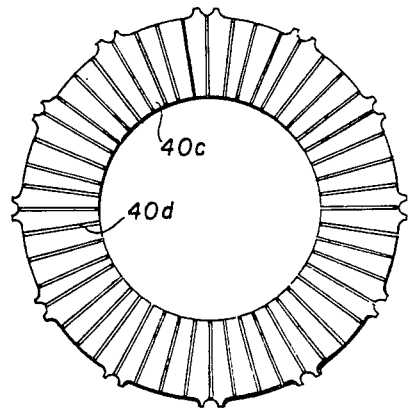
FIG. 4 is a front view of the opposite face of the stator plate of FIG. 3.

A preferred embodiment of the stator discs is shown in FIGS. 3–5. FIG. 3 illustrates the working face of the stator disc 40a. The outer periphery has radial tongues forming semicircular notches therein which register with and receive the bolts, such as bolt 30 of FIG. 1. The stack of stator discs is suspended within the housing by bearing against twelve bolts such as bolts 30. Stator disc 40a thus has a smooth working face 40b which confronts and is to be forced into contact with the working face of the disc 38a.

FIG. 4 illustrates a preferred form of the stator disc 40a. The nonworking face 40c, i.e., the face opposite the working face 40b, is shown. The nonworking face 40c is provided with a plurality of radially extending grooves 40d. The grooves 40d are provided in number and in cross sectional area such that the combined flow passage area is about three times the combined area of the outward flow passage or grooves, such as grooves 38b, in the working face of the rotor disc.

Figure 7:
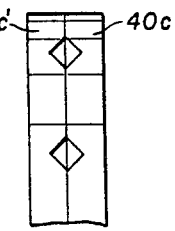
FIG. 7 is a similar view, but with grooves aligned rather than offset.

In FIG. 5, two discs 40a and 40e are shown with the nonworking faces confronting one another and with the passages 40d in staggered relationship. In accordance with the embodiment of the invention shown in FIG. 1, two stator discs are provided between each adjacent pair of rotor discs. In FIG. 5, the grooves 40d in the nonworking faces are staggered. In the embodiment shown in FIG. 1, the grooves are not staggered, but are in registration one with another. The staggered relationship of grooves is shown in the enlarged view of FIG. 6. The aligned or registered relationship of the grooves is shown in the enlarged view of FIG. 7. So far as ascertained, the staggered groove arrangement of FIG. 6 or the aligned or registered groove arrangement of FIG. 7 are equally effective. The essential point is that the flow passages are provided such as to permit the direct and local return flow of fluid from the outer perimeter to the inner perimeter of the stator discs so that a plurality of local flow paths are completed.

More particularly, the rotor discs fit onto sleeve 39 such that zones 39d, 39e, 39f, etc. are substantially separated from one another to provide flow cavities to facilitate circulation. Oil is pumped from zone 39f, for example, through the grooves in the rotor discs 40a and 40a'. The oil is thus directed out into the housing at the periphery of the rotor discs. The oil in the outer periphery of the housing is then forced under pressure back through the grooves in the nonworking faces of the stator discs 40c and 40c' so that there is local circulation to supply each of the zones 39d, 39e, 39f, etc., the supply being by way of the grooves in the nonworking faces of the stator discs. Because such local circulation is provided, hot spots or dry areas within the brake stack is avoided and a working system is provided.

It was previously explained that the coolant liquid is supplied inside the housing to rise to a level of about one-third of the distance from the housing wall to the shaft when the system is at rest.

Preferably, the cooling liquid will be one of the highly refined hydrocarbons generally available and widely used for heat transfer applications and in power transformers in electrical systems. A typical and satisfactory coolant fluid may be the product manufactured and sold by Shell Oil Company and identified as Therma 30 and/or Therma 44, the latter being capable of operating satisfactorily in environments of higher temperatures than the former.

Where such a fluid is provided in a system such as shown in FIG. 1, and with return passages through the stator discs between each of the rotor discs, then there is avoided the dry areas and the resultant brake deterioration heretofore characteristic of long stack rotor and stator disc assemblies. The impetus for the flow of return oil back through the stator discs is the pressure built by the pumping action of the oil as it flows through the grooves, such as groove 38b in rotor 38a. The oil in the quantities and character above described tends to slosh or foam in the area outside the rotor as the result of the rotor action. Thus, the pressure reduction near sleeve 39 and pressure built at the periphery of discs 38, 40 causes flow of oil back through multiple channels in stator discs.

Figure 8:
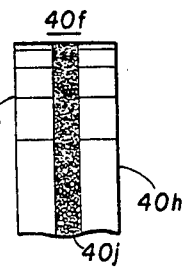
FIG. 8 illustrates a modified form of stator plates utilizing a porous center body.

In FIG. 8, a modified form of stator disc has been shown. The disc 40f comprises a sandwich of metal plates 40g and 40h and a filler disc 40j of a porous ceramic material. The discs 40g and 40h would each have smooth working faces such as the face 40b of FIG. 3. The flow channels for return flow of the coolant liquid would be through the passageways formed in the ceramic filler 40j. While the surface plates 40g and 40h have been shown as being relatively thick metal plates adhered to the ceramic filler disc 40j, it will be understood that the plates may be a surface application of metal to a thick ceramic disc. The ceramic disc may be of the type such as of magnesium oxide or aluminum oxide with silica mixtures as are well known in the art whereby the permeability has a gross effect equivalent to that of the grooves 40d when arranged in the combination shown in FIG. 5.

Figure 9:
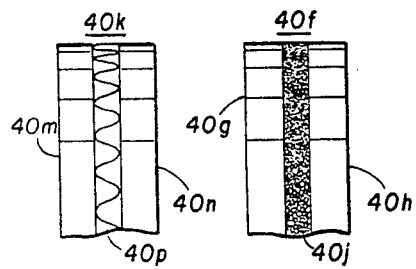
FIG. 9 is an alternative structure wherein corrugated spacer member is employed in the stator.

FIG. 9 illustrates a further embodiment where a stator disc 40k is formed with plates 40m and 40n each having smooth working faces spaced apart by a corrugated filler body 40p where the filler body may be a corrugated metal of bellville washer character having rigidity or strength sufficient to maintain the initial spacing and providing radial flow channels from the outer to inner periphery.

Figure 10:
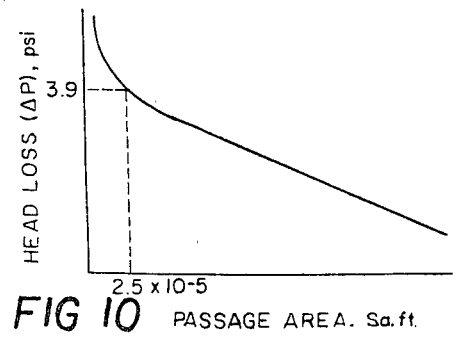
FIG. 10 is a graph illustrating head loss as a function of the passage area in the passages of FIGS. 4–9.

For any given configuration of return passages in the nonworking area or face of the rotor discs, the passage area will be provided as to avoid significant head loss. For example, as shown in FIG. 10, head loss has been plotted as a function of passage area. FIG. 10 may be viewed as portraying the loss in pressure as a fluid of given viscosity flows through a pipe of given length where the pipe cross sectioned area is the independent variable. It is shown that the passage area needs to be adequate to avoid operation above the sharp knee in the curve. Below the knee in the curve of FIG. 10 the upper limit in passage area will be such that adequate structure is maintained to withstand the axial forces present in compression of the disc stack to apply the brakes with the desired force.

Figure 11:
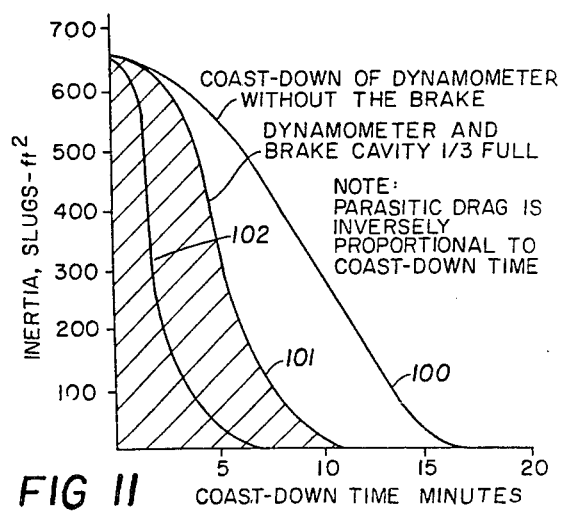
FIG. 11 illustrates the reduction of parasitic losses achieved by utilization of the present invention.

FIG. 11 illustrates the reduction of parasitic drag that is achieved through utilizing the present invention. This has to do as above mentioned with the maintenance of foam between the working faces of the rotor and stator disc when the brake is not operative.

In FIG. 11, it is to be noted that parasitic drag is inversely proportional to the coast down time. The data for curves 100, 101 and 102 illustrate performance of a braking system such as involved in the present invention. On a dynamometer system, the rotating portion was driven to a predetermined initial speed and then the driving force removed. The system was permitted to coast to stop. This was done with a given rotating system having successively increasing inertia as varied by the successive addition of weights to the rotating system for successive tests.

Curve 100 represents the performance of the dynamometer system without the presence of brake structure of the present invention.

Curve 101 illustrates the performance of the dynamometer system to which the brake of the present invention has been applied with the brake cavity one-third full of coolant fluid as above described.

Curve 102 illustrates the typical performance of conventional brake systems wherein the parasitic drag significantly loads the system. Local circulation to maintained wet surfaces during coast down is believed the basis for the more favorable performance characteristics represented by curve 101 as compared with curve 102. The significant aspect of the present invention is the avoidance of dry spots whether the brakes are applied or whether it is in the coasting nonbraking state.

Thus, in accordance with the present invention, a brake system is provided wherein a rotor disc assembly is driven from a shaft with the members of the assembly movable axially along the shaft and wherein an assembly of stator discs are splined to a housing and are separated adjacent members of the rotor disc assembly with the stator disc structure between each pair of rotor discs having low impedance flow channels radially extending from the outer to the inner peripheries for return flow of oil therethrough.

Having described the invention in connection with certain specific embodiments thereof, it is to be understood that further modifications may now suggest themselves to those skilled in the art and it is intended to cover such modifications as fall within the scope of the appended claims.

What is claimed is:

1. A liquid-cooled disc brake assembly comprising:
   (a) a casing having a quantity of liquid disposed therein less than the liquid capacity of said casing, said casing being sealed for retention of said liquid quantity and operable to continuously retain said liquid quantity therein,
   (b) a plurality of rotor discs mounted for rotation with respect to said casing about an axis of rotation within said casing,
   (c) means for connecting said rotor discs to an external rotating body which is to be selectively braked,
   (d) means for mounting said rotor discs for relative movement along the axis of rotation thereof,
   (e) a plurality of stator discs disposed within said housing and having essentially flat, exterior disc surfaces, said flat disc surfaces thereof being arranged perpendicular to said axis of rotation,
   (f) means for mounting said stator discs in juxtaposed relationship with respect to said rotor discs and for relative movement along the axis of rotation of said rotor discs while not allowing rotation of said stator discs,
   (g) means for biasing said rotor and stator discs to a relatively widely spaced apart position whereby no braking action is performed therewith,
   (h) heat exchanging means formed on casing portions that extend generally parallel to said axis of rotation, said heat exchanging means comprising a plurality of fins extending inwardly and outwardly from said casing and generally radially toward and away from said axis of rotation,
   (i) means for establishing a closed circulatory loop for said cooling liquid during braking so that said cooling liquid is pumped outwardly from adjacent the axis of rotation of said rotor discs toward said casing heat exchanging fins, splashing thereagainst and thereby frothing, and then is allowed to pass inwardly toward said axis of rotation in response to negative pressure adjacent said axis of rotation, said means including means defining interior passageways in at least one of said stator discs for the passage of liquid therethrough inwardly toward said axis of rotation, and
   (j) first means for moving said rotors and stators toward each other against the bias of said biasing means to effect braking.

2. The disc brake as claimed in claim 1 wherein the interior passageways in a stator disc are radial flow passages, such that the shortest possible flow paths extend between the periphery and the center of the disc.

3. The brake system as claimed in claim 1 wherein the interior passageways within a brake are uniformly distributed across the thickness of the plurality of stator discs and also radially around each stator disc.

4. The brake system as claimed in claim 1 wherein each rotor disc has a plurality of surface grooves to pump outward the cooling liquid as the rotor discs rotate with respect to the stator discs.

5. The brake system as claimed in claim 4 wherein said housing is of a material having heat conductive properties equivalent to aluminum to form an external heat exchanger for the cooling liquid.

* * * * *